US012233504B2

(12) United States Patent
Qu et al.

(10) Patent No.: US 12,233,504 B2
(45) Date of Patent: Feb. 25, 2025

(54) ANGLE GRINDER

(71) Applicant: MILWAUKEE ELECTRIC TOOL CORPORATION, Brookfield, WI (US)

(72) Inventors: Jian Gang Qu, Dongguan (CN); Zhi Hai Liu, Zaoyang (CN); Ming Cong Chen, Hua Zhou (CN)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 1296 days.

(21) Appl. No.: 16/711,966

(22) Filed: Dec. 12, 2019

(65) Prior Publication Data
US 2020/0189066 A1 Jun. 18, 2020

(30) Foreign Application Priority Data
Dec. 17, 2018 (CN) .......................... 201822120120.1

(51) Int. Cl.
*B24B 23/02* (2006.01)
(52) U.S. Cl.
CPC .................. *B24B 23/028* (2013.01)
(58) Field of Classification Search
CPC .............................. B24B 23/028; B24B 23/02
USPC ......... 451/359, 348, 259, 915; 188/72.3, 74, 188/71.1
See application file for complete search history.

(56) References Cited

U.S. PATENT DOCUMENTS

| 1,607,161 A * | 11/1926 | Judd ........................ F16D 65/04 |
| | | 188/2 R |
| 1,634,149 A | 6/1927 | Klausmeyer |
| 1,811,066 A | 6/1931 | Tannewitz |
| 1,987,675 A | 1/1935 | Gallimore |
| 2,151,274 A | 3/1939 | Hindman |

(Continued)

FOREIGN PATENT DOCUMENTS

| CN | 2841243 Y | 3/2002 |
| CN | 102990489 A | 3/2013 |

(Continued)

OTHER PUBLICATIONS

International Search Report and Written Opinion for Application No. PCT/US2019/065914 dated Apr. 10, 2020 (10 pages).

(Continued)

*Primary Examiner* — Brian D Keller
*Assistant Examiner* — Jason Khalil Hawkins
(74) *Attorney, Agent, or Firm* — Michael Best & Friedrich LLP (57) ABSTRACT

An angle grinder comprises a motor and an output member to which a grinding disc is attachable. The output member defines an output axis. A drive shaft is configured to transfer torque from the motor to the output member. A braking disc is coupled to the drive shaft and a braking pad is moveable in a direction transverse to the drive axis between a first braking pad position and a second braking pad position, in which the braking pad is not in contact with the braking disc. A biasing member biases the braking pad toward the first braking pad position and a trigger is pivotable about a trigger axis between a first trigger position and a second trigger position. In response to the trigger being pivoted from the first to the second trigger position, the braking pad is moved from the first to the second braking pad position.

24 Claims, 8 Drawing Sheets

(56) References Cited

U.S. PATENT DOCUMENTS

| | | |
|---|---|---|
| 2,261,059 A | 10/1941 | Gris |
| 2,374,716 A | 5/1945 | Wiken |
| 2,770,092 A | 11/1956 | Wood |
| 2,898,956 A | 8/1959 | Zern |
| 3,063,230 A | 11/1962 | Tetreault |
| 3,135,881 A | 6/1964 | Fresard |
| 3,513,652 A | 5/1970 | Hare |
| 3,673,783 A | 7/1972 | Timbie |
| 3,731,768 A | 5/1973 | Fetzer |
| 4,006,528 A | 2/1977 | Katsuya |
| 4,125,916 A | 11/1978 | King et al. |
| 4,400,158 A | 8/1983 | Garcia |
| 4,420,885 A | 12/1983 | Todero |
| 4,594,780 A | 6/1986 | Schliemann et al. |
| 4,778,036 A | 10/1988 | Nowak |
| 4,834,220 A | 5/1989 | Nowak |
| 4,932,627 A | 6/1990 | Nowak |
| 4,988,072 A | 1/1991 | Nowak |
| 5,417,047 A | 5/1995 | Locatelli |
| 5,879,111 A | 3/1999 | Stock et al. |
| 6,227,337 B1 | 5/2001 | Bernhardt et al. |
| 6,350,087 B1 | 2/2002 | Berry et al. |
| 6,633,146 B2 | 10/2003 | Hartmann et al. |
| 6,707,192 B2 | 3/2004 | Herzog |
| 7,537,065 B2 * | 5/2009 | Gallagher ............... B24B 55/00 173/217 |
| 7,856,724 B2 | 12/2010 | Hartmann |
| 8,596,427 B2 | 12/2013 | Numata |
| 8,618,704 B2 | 12/2013 | Hiller et al. |
| 8,657,032 B2 | 2/2014 | Numata |
| 9,278,426 B2 | 3/2016 | Numata |
| 9,387,570 B2 | 7/2016 | Maute et al. |
| 9,399,278 B2 | 7/2016 | Kuether |
| 9,410,586 B2 | 8/2016 | Esenwein |
| 9,546,701 B2 | 1/2017 | Wiker et al. |
| 2002/0026717 A1 | 3/2002 | Hartmann |
| 2008/0146127 A1 | 6/2008 | Gallagher et al. |
| 2012/0244788 A1 | 9/2012 | Numata |
| 2013/0292148 A1 | 11/2013 | Zhen et al. |
| 2014/0076678 A1 | 3/2014 | Schadow et al. |
| 2014/0124307 A1 | 5/2014 | Esenwein |
| 2015/0087211 A1* | 3/2015 | Baykara ................. B24B 47/26 188/74 |

FOREIGN PATENT DOCUMENTS

| | | |
|---|---|---|
| CN | 203330885 U | 12/2013 |
| CN | 105014541 A | 11/2015 |
| DE | 2221581 A1 | 11/1973 |
| DE | 3722629 A1 | 1/1989 |
| DE | 4005181 C1 | 10/1991 |
| DE | 9114741 U1 | 1/1992 |
| EP | 1938924 A1 | 7/2008 |
| EP | 2111948 A1 | 10/2009 |
| EP | 2111949 A1 | 10/2009 |
| EP | 2138279 A1 | 12/2009 |
| GB | 409836 A | 5/1934 |
| GB | 541703 A | 12/1941 |
| GB | 684412 A | 12/1952 |
| GB | 907538 A | 10/1962 |
| GB | 1072684 A | 6/1967 |
| WO | 2012019344 A1 | 2/2012 |
| WO | WO-2012159801 A1 * | 11/2012 ......... B23Q 11/0092 |

OTHER PUBLICATIONS

Metabo, "WB11-150 Quick 6 Inch Angle Grinder", <https://www.amazon.com/metabo-w11-150-quick-6-inch-grinder/dp/b0001csejme>, web page accessed Sep. 1, 2009.

* cited by examiner

ANGLE GRINDER

FIELD OF THE INVENTION

The present invention relates to grinding tools, and more particularly to angle grinders tools.

BACKGROUND OF THE INVENTION

Grinding tools include a drive shaft of a motor to rotate an output member holding a grinding disc. After a period of operation, when the motor is deactivated, the rotational inertia of the drive shaft causes the output member and the grinding disc to continue to rotate.

SUMMARY OF THE INVENTION

The present invention provides, in one aspect, an angle grinder comprising a motor and an output member to which a grinding disc is attachable. The output member defines an output axis. The angle grinder further comprises a drive shaft configured to transfer torque from the motor to the output member. The drive shaft defines a drive axis that is transverse to the output axis. The angle grinder further comprises a braking disc coupled to the drive shaft for rotation therewith and a braking pad moveable in a direction transverse to the drive axis between a first braking pad position, in which the braking pad is in contact with the braking disc, and a second braking pad position, in which the braking pad is spaced from and not in contact with the braking disc. The angle grinder further comprises a biasing member biasing the braking pad toward the first braking pad position and a trigger pivotable about a trigger axis between a first trigger position, in which the motor is deactivated, and a second trigger position, in which the motor is activated. In response to the trigger being pivoted from the first trigger position to the second trigger position, the braking pad is moved from the first braking pad position to the second braking pad position.

The present invention provides, in another aspect, an angle grinder comprising a motor and an output member to which a grinding disc is attachable. The output member defines an output axis. The angle grinder also comprises a drive shaft configured to transfer torque from the motor to the output member. The drive shaft defines a drive axis that is transverse to the output axis. The angle grinder further comprises a braking disc coupled to the drive shaft for rotation therewith and a braking pad moveable between a first braking pad position, in which the braking pad is in contact with the braking disc, and a second braking pad position, in which the braking pad is spaced from and not in contact with the braking disc. The angle grinder further comprises a biasing member wrapped around the braking pad and biasing the braking pad toward the first braking pad position, and a trigger moveable between a first trigger position, in which the motor is deactivated, and a second trigger position, in which the motor is activated. In response to the trigger being moved from the first trigger position to the second trigger position, the braking pad is moved from the first braking pad position to the second braking pad position.

The present invention provides, in yet another aspect, an angle grinder comprising a motor and an output member to which a grinding disc is attachable. The output member defines an output axis. The angle grinder further comprises a drive shaft configured to transfer torque from the motor to the output member. The drive shaft defines a drive axis that is transverse to the output axis. The angle grinder also comprises a braking disc coupled to the drive shaft for rotation therewith and a braking pad moveable between a first braking pad position, in which the braking pad is in contact with the braking disc, and a second braking pad position, in which the braking pad is spaced from and not in contact with the braking disc. The angle grinder also comprises a biasing member biasing the braking pad toward the first braking pad position and a trigger pivotable about a trigger axis between a first trigger position, in which the motor is deactivated, and a second position, in which the motor is activated. The angle grinder also comprises a linkage pivotable about a linkage axis that is parallel to the trigger axis from a first linkage position, in which the braking pad is in the first braking pad position, to a second linkage position, during which the linkage moves the braking pad from the first braking pad position to the second braking pad position. The linkage is moved from the first linkage position to the second linkage position in response to the trigger being pivoted from the first trigger position to the second trigger position.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
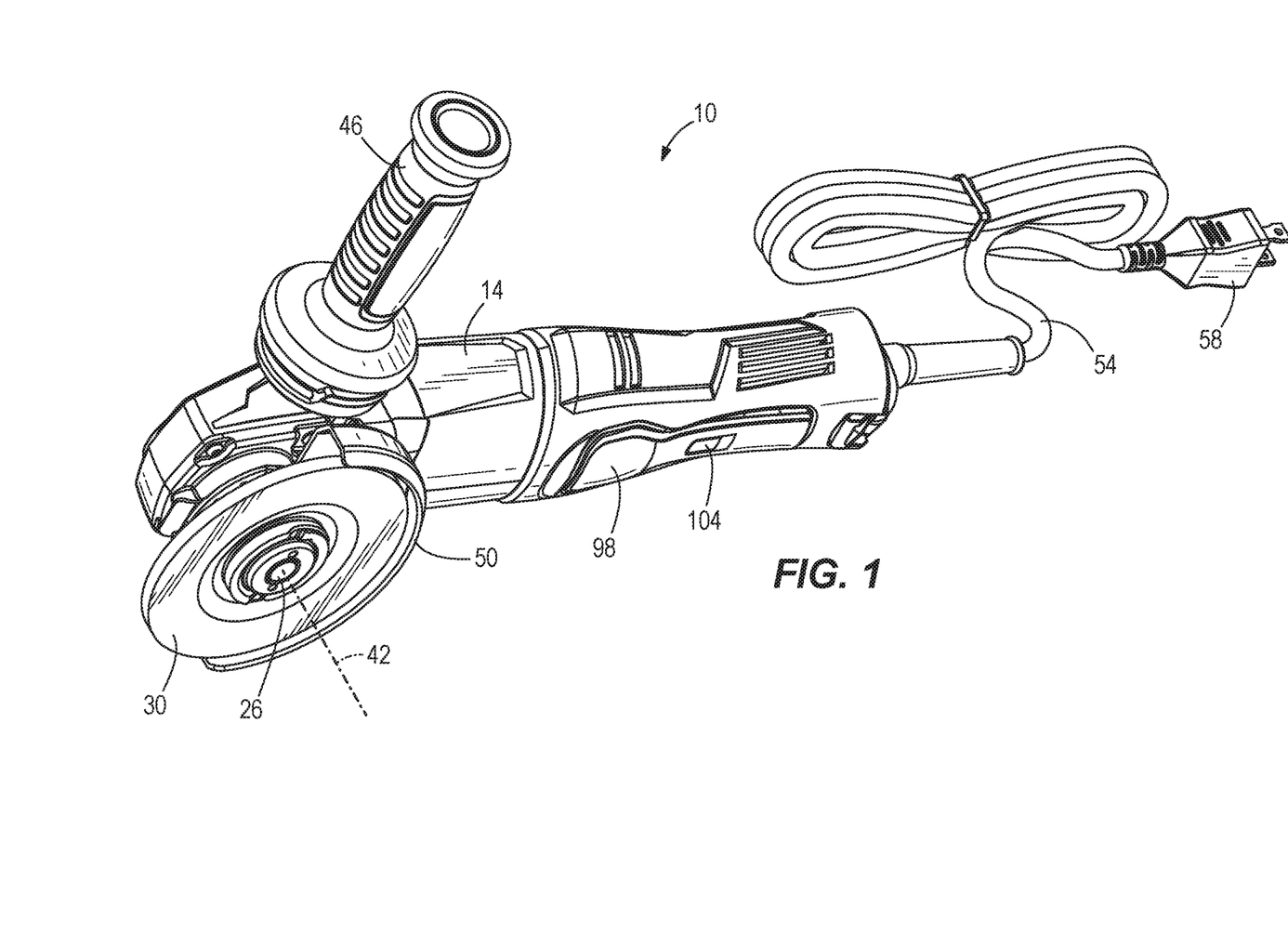
FIG. 1 is perspective view of an angle grinder.
Figure 2:
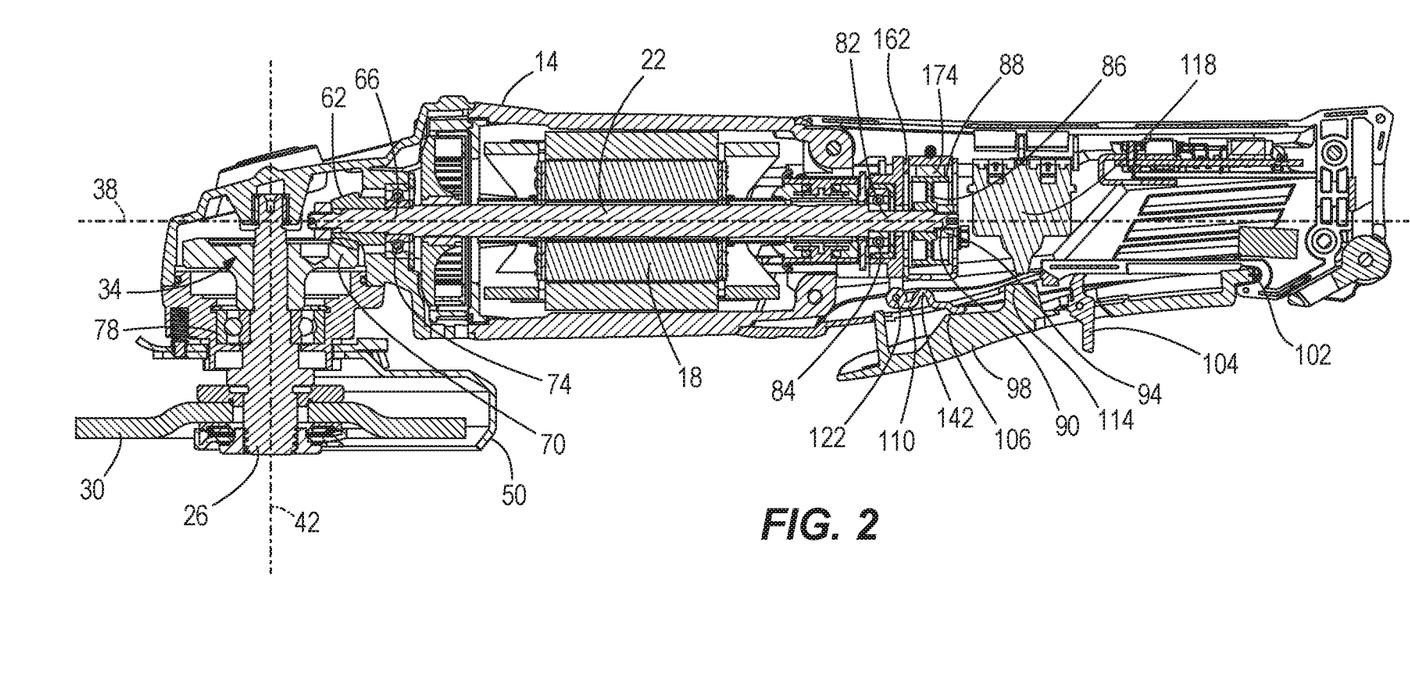
FIG. 2 is a cross-sectional view of the angle grinder of FIG. 1.
Figure 3:
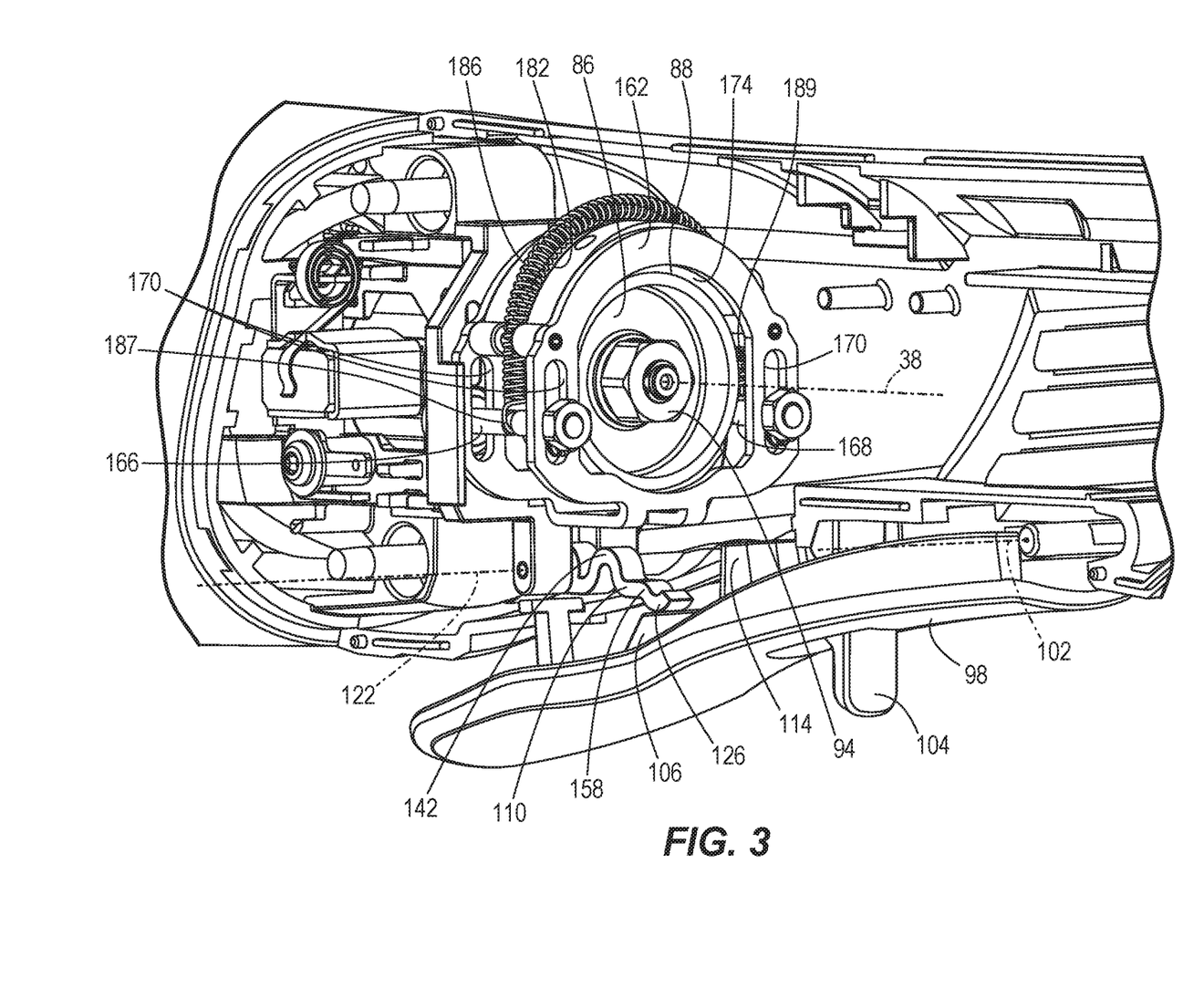
FIG. 3 is a perspective view of the angle grinder of FIG. 1, with portions removed and a trigger in a first trigger position.

As shown in FIGS. 1 and 2, a grinding tool, such as a angle grinder 10, includes a housing 14, a motor 18 having a drive shaft 22, an output member 26 to which a grinding disc 30 is attachable, a transmission 34 for transmitting torque from the drive shaft 22 to the output member 26. As shown in FIG. 3, the drive shaft 22 defines a drive axis 38 and the output member 26 defines an output axis 42 that is transverse to the drive axis 38. In the illustrated embodiment, the drive axis 38 is perpendicular to the output axis 42. With reference to FIG. 1, the angle grinder 10 includes a handle 46 extending from the housing 14, a guard 50 surrounding a rear side of the grinding disc 30, and a cord 54 with a plug 58 for plugging into an AC outlet, such that the motor 18 can draw power from the AC outlet via the cord 54. In other embodiments, the cord 54 is omitted and instead, the motor 18 can be powered by a removable and rechargeable battery pack.

As shown in FIG. 2, the transmission 34 includes a bevel drive gear 62 coupled for rotation with a front portion 66 of the drive shaft 22 and a beveled driven ring 70 coupled for rotation with the output member 26 and engaged by drive gear 62, such that rotation of the drive shaft 22 drives rotation of the output member 26 via the drive gear 62 and driven ring 70. The front portion 66 of the drive shaft 22 is rotatably supported within the housing 14 via a first bearing 74 and the output member 26 is rotatably supported within the housing 14 via a second bearing 78.

Figure 4:
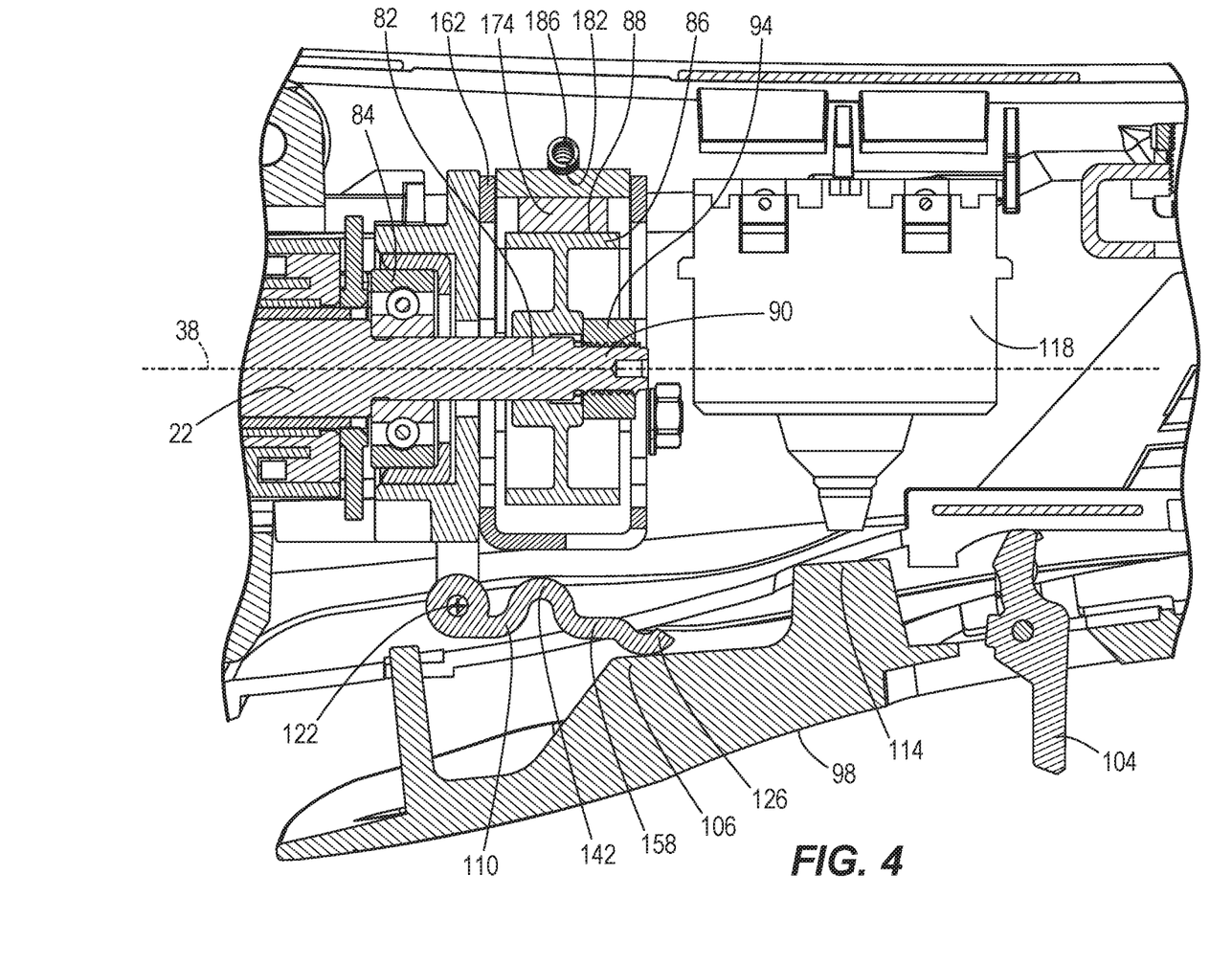
FIG. 4 is an enlarged cross-sectional view of the angle grinder of FIG. 1, with a trigger in a first trigger position.

As shown in FIG. 4, a rear portion 82 of the drive shaft 22 is rotatably supported by a third bearing 84 and has a braking disc 86 coupled for rotation therewith. Specifically, the rear portion 82 of the drive shaft 22 has a double-D cross-sectional shape and is received within an aperture in the braking disc 86 having a corresponding double-D cross-sectional shape, thus ensuring co-rotation of the drive shaft 22 and braking disc 86. In the illustrated embodiment, the braking disc 86 has an annular exterior circumference 88, but in other embodiments, the braking disc 86 can take other forms or shapes. The rear portion 82 of the drive shaft 22 terminates in a threaded portion 90 onto which a nut 94 is received to prevent rearward axial displacement of the braking disc 86 along the rear portion 82 of the drive shaft 22.

With reference to FIGS. 1-6, the angle grinder 10 also includes a trigger 98 for activating the motor 18. The trigger 98 is pivotable with respect to the housing 14 about a trigger axis 102 (FIG. 2) between a first trigger position shown in FIGS. 3 and 4, and a second trigger position shown in FIGS. 5 and 6. The trigger 98 includes a trigger lock-out member 104 that is pivotable with respect to the trigger 98 between a lockout position shown in FIGS. 3 and 4, in which the trigger 98 is locked in the first trigger position and prevented from being moved to the second trigger position, and a release position shown in FIGS. 5 and 6, in which the trigger 98 is permitted to move to the second trigger position. The trigger 98 also includes a fin 106 that is in contact with a linkage 110, which is described in further detail below. The trigger 98 also includes a switch contact portion 114 (FIG. 4) that actuates a motor activation switch 118 when the trigger 98 is in the second trigger position. When the trigger 98 is in the first trigger position, the switch contact portion 114 is spaced from the motor activation switch 118, as shown in FIGS. 3 and 4.

Figure 5:
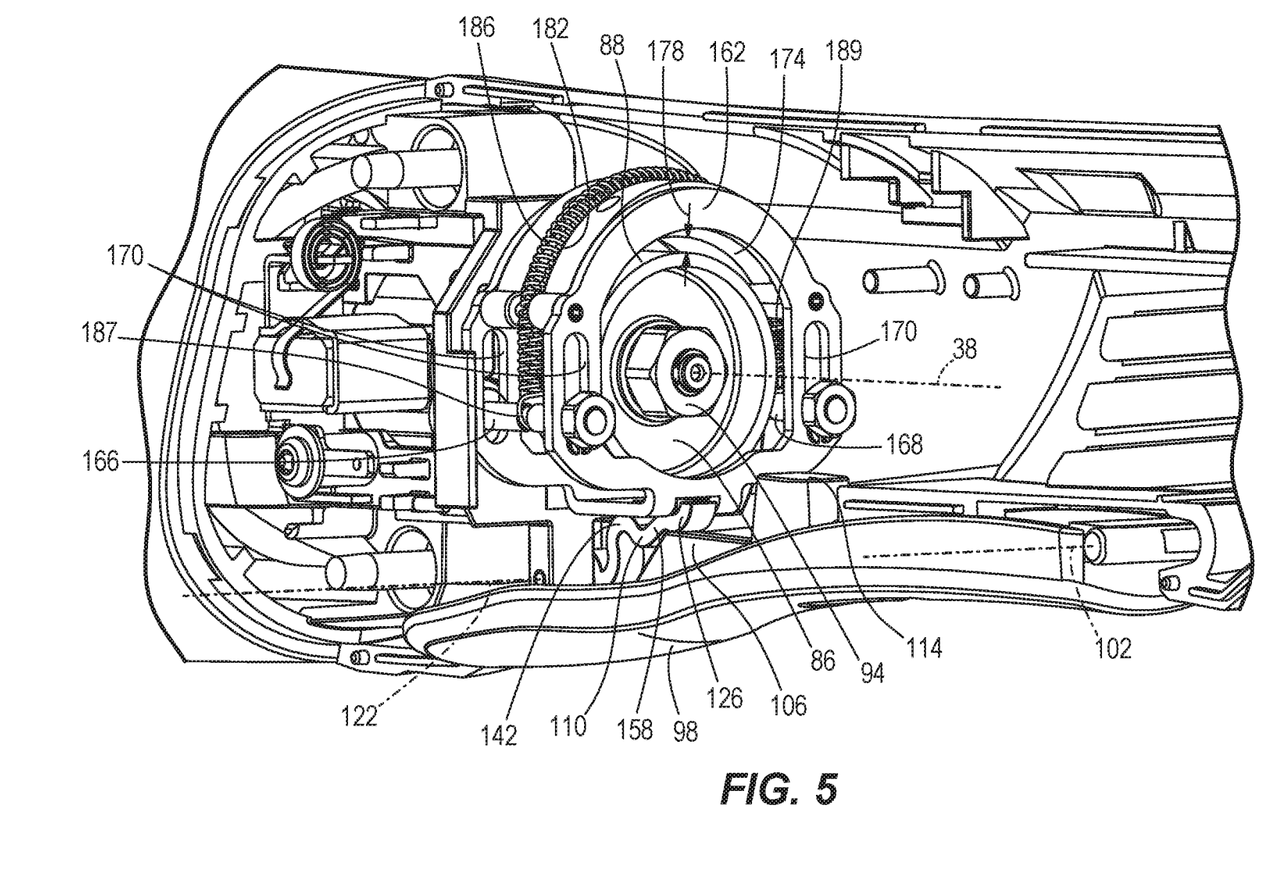
FIG. 5 is a perspective view of the angle grinder of FIG. 1, with portions removed and a trigger in a second trigger position.
Figure 6:
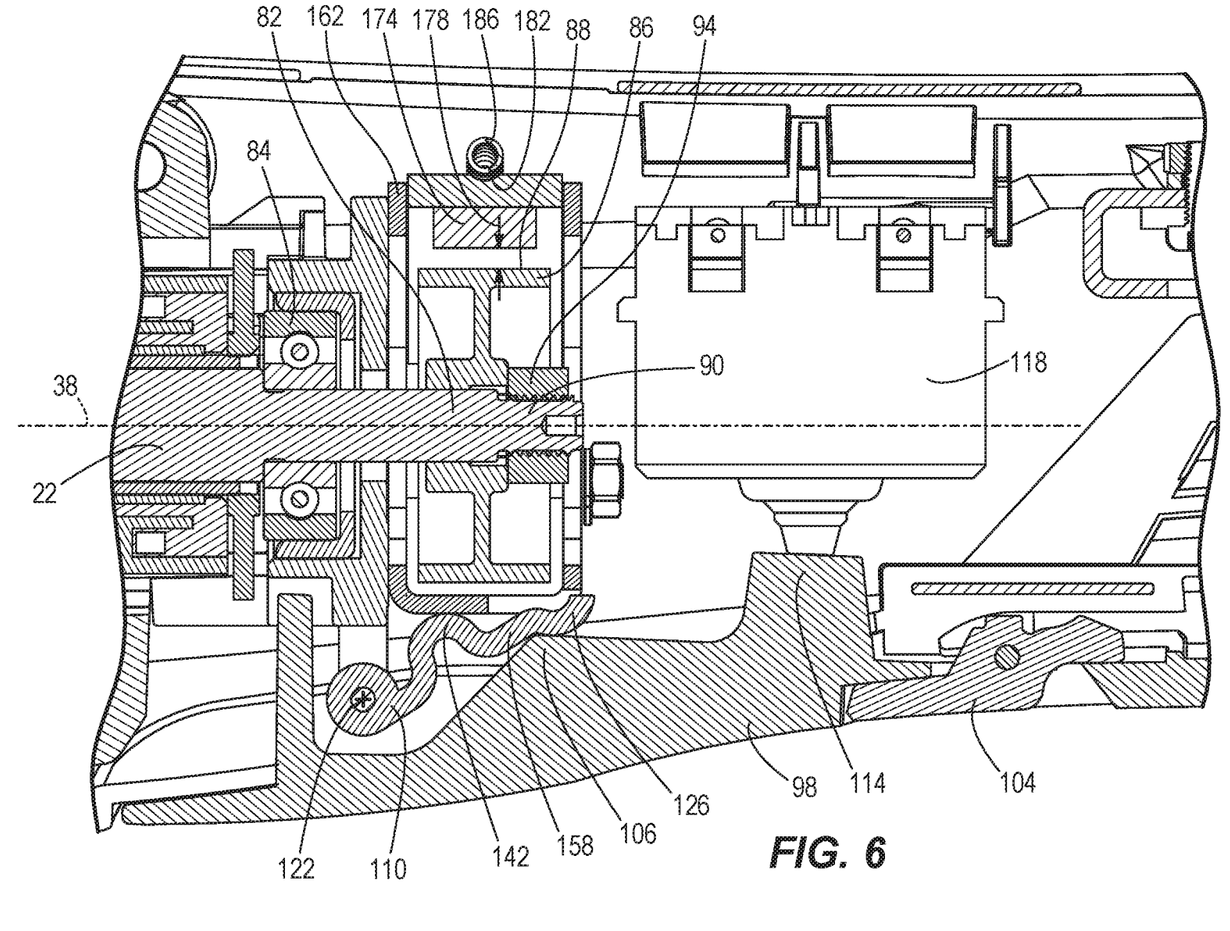
FIG. 6 is an enlarged cross-sectional view of the angle grinder of FIG. 1, with a trigger in a second trigger position.
Figure 7:
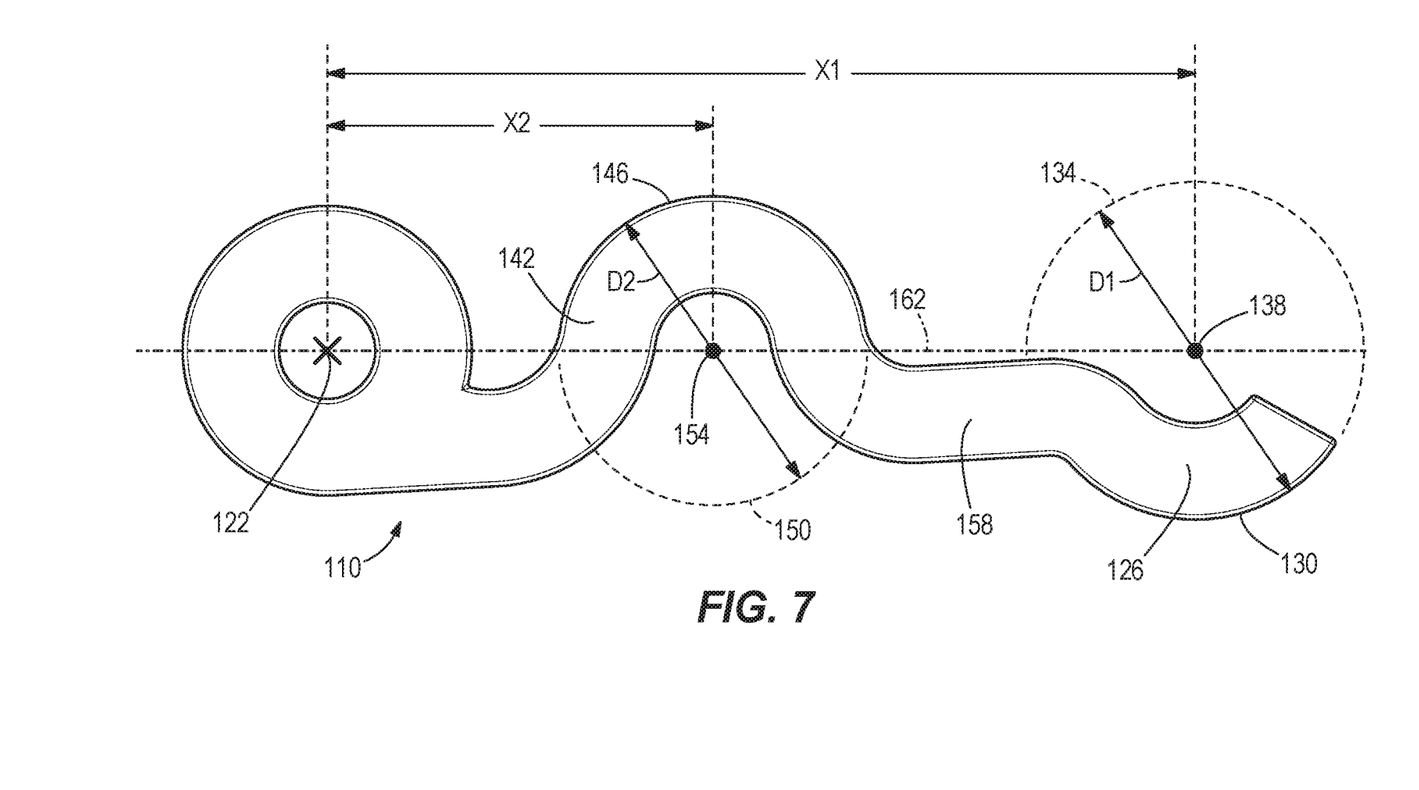
FIG. 7 is a plan view of a linkage of the angle grinder of FIG. 1.
Figure 8:
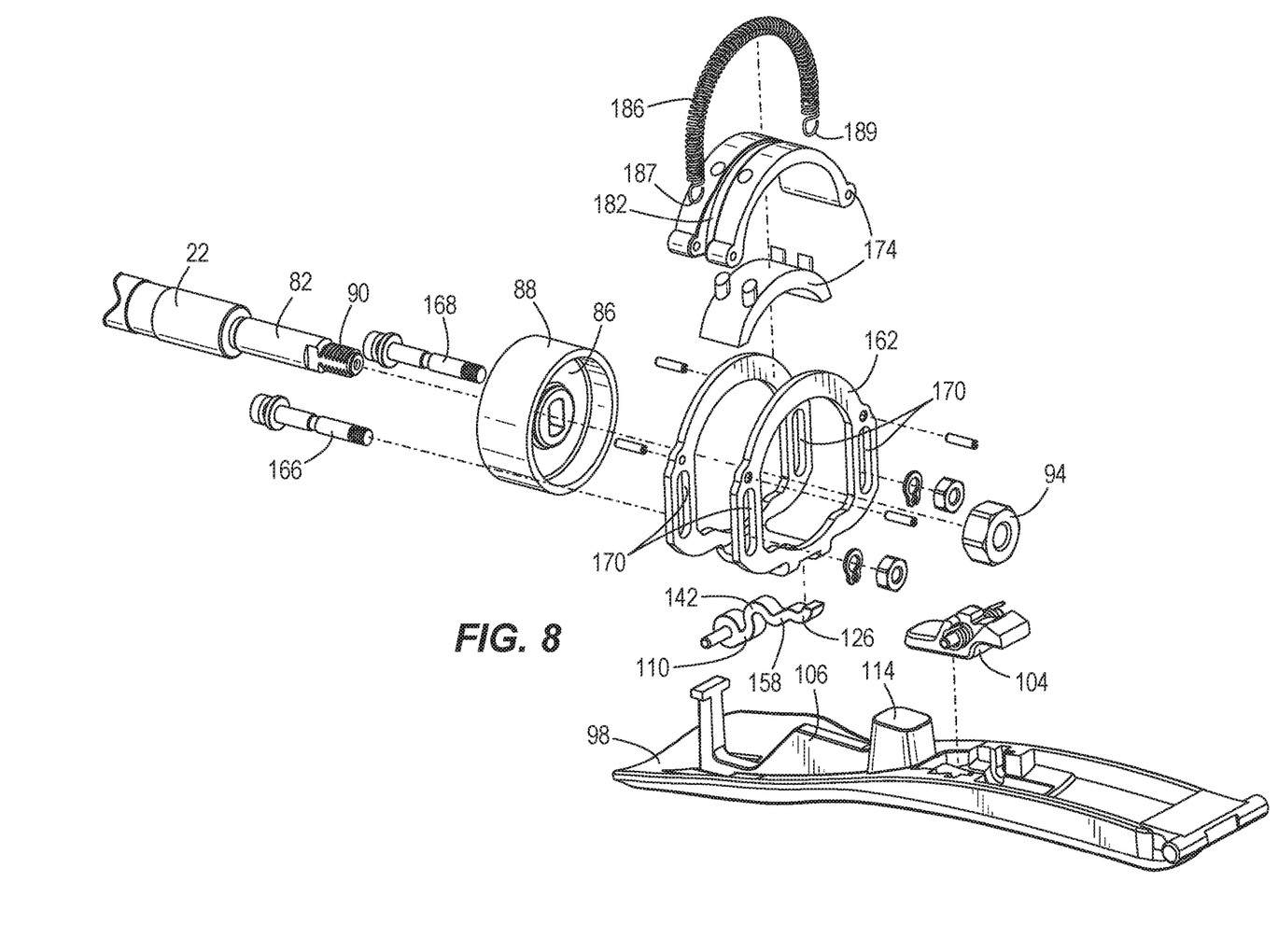
FIG. 8 is an exploded view of the angle grinder of FIG. 1, with portions removed.

With reference to FIGS. 2-6, the linkage 110 is pivotable about a linkage axis 122 between a first linkage position, shown in FIGS. 3 and 4, and a second linkage position shown in FIGS. 5 and 6. With reference to FIG. 7, the linkage 110 includes a first arcuate portion 126 with a partial outer circumference 130 that partially defines a first circle 134 having a first origin 138 and a first diameter D1. The linkage 110 also includes a second arcuate portion 142 with a partial outer circumference 146 that partially defines a second circle 150 having a second origin 154 and a second diameter D2. A connecting portion 158 extends between the second arcuate portion 142 and the first arcuate portion 126. A reference axis 162 that is substantially parallel to the connecting portion 158 extends through the linkage axis 122, the second origin 154, and the first origin 138. A distance X1 is defined between the first origin 138 and the linkage axis 122 along the reference axis 162 and a distance X2 is defined between the second origin 154 and the linkage axis 122 along the reference axis 162. In some embodiments, D1 is equal to 7 millimeters, D2 is equal to 6.4 millimeters, X1 is equal to 18 millimeters, and X2 is equal to 8 millimeters.

With reference again to FIGS. 2-6, the fin 106 is configured to engage the first arcuate portion 126 of the linkage 110, whereas the second arcuate portion 142 of the linkage 110 is configured to engage a frame 162 that is supported for translation relative to a first rail 166 and a second rail 168 in a direction that is transverse to the first and second rails 166, 168. The first and second rails 166, 168 are fixed within the housing 14. Specifically, the frame 162 includes corresponding aligned slots 170 through which the rails 166, 168 extend. The frame 162 is moveable with respect to the rails 166, 168 in a direction transverse to the drive axis 38. In the illustrated embodiment, the frame 162 moves in a direction perpendicular to the drive axis 38.

A braking pad 174 is coupled to the frame 162 for movement therewith in a direction transverse to the drive axis 38 (FIG. 3). In the illustrated embodiment, the braking pad 174 moves in a direction perpendicular to the drive axis 38 with the frame 162. The braking pad 174 is moveable between a first braking pad position, in which the braking pad 174 is in contact with the braking disc 86 as shown in FIGS. 3 and 4, and a second braking pad position, in which the braking pad 174 is spaced from and not in contact with the braking disc 86. Specifically, when the braking pad 174 is in the second braking pad position shown in FIGS. 5 and 6, a gap 178 exists between the braking pad 174 and the braking disc 86.

The braking pad 174 has a semi-circular profile, such that when the braking pad 174 is in the first braking pad position, the braking pad 174 can mate against the annular exterior circumference 88 of the braking disc 86. However, in other embodiments the braking pad 174 can take a different form or shape. The braking pad 174 includes a groove 182 in which a biasing member, such as spring 186, is arranged (FIGS. 3-5). The spring 186 has a first spring end 187 and a second spring end 189 (FIGS. 3 and 5). The first spring end 187 is secured to the first rail 166 and the second spring end 189 is secured to the second rail 168. In other embodiments, the first and second spring ends 187, 189 are secured elsewhere on the grinding tool 10. The spring 186 is wrapped around the braking pad 174 and is situated in the groove 182, such that the spring 186 biases the braking pad 174 toward the first braking pad position.

In operation, when an operator wishes to operate the angle grinder 10, the operator first moves the trigger lockout member 104 from the lockout position of FIGS. 3 and 4 to the release position. The operator then pivots the trigger 98 from the first trigger position to the second trigger position of FIGS. 5 and 6, such that the fin 106 of the trigger 98 pushes against the first arcuate portion 126 of the linkage 110 to cause movement of the linkage 110 from the first linkage position to the second linkage position. Movement of the linkage 110 to the second position causes the second arcuate portion 142 of the linkage 110 to contact and move the frame 162, such that the braking pad 174 is moved from the first braking pad position to the second braking pad position of FIGS. 5 and 6. Thus, the braking pad 174 is separated from the braking disc 86, resulting in the gap 178 between the braking pad 174 and braking disc 86. Also, movement of the trigger 98 from the first trigger position to the second trigger position causes the switch contact portion 114 of the trigger 98 to actuate the motor activation switch 118, thereby activating the motor 18 and causing rotation of the drive shaft 22 about the drive axis 38. Rotation of the drive shaft 22 in turn causes rotation of the output member 26 about the output axis 42, thus rotating the grinding disc 30 for a grinding operation.

When the operator has finished the grinding operation, the operator releases the trigger 98, which is returned to the first trigger position, thus allowing the linkage 110 to move away from the frame 162 and allowing the spring 186 to return the braking pad 174 to the first braking pad position. Also, movement of the trigger 98 to the first trigger position removes the switch contact portion 114 of the trigger 98 from the motor activation switch 118, resulting in deactivation of the motor 18. Despite the motor 18 being deactivated, the inertia from the grinding operation causes the drive shaft 22 and thus the grinding disc 30 to continue rotating. However, because the braking pad 174 has been returned to the first braking pad position, contact between the braking pad 174 against the braking disc 86 creates friction that slows and eventually stops the rotation of the braking disc 86 and drive shaft 22, and thus rotation of the grinding disc 30. In this manner, the operator does not need to wait for the grinding disc 30 to stop spinning or otherwise hold the grinding disc 30 against a work surface to slow its rotation.

Because the fin 106 of the trigger 98 contacts the first arcuate portion of the 126 of the linkage 110, and the second arcuate portion 142 of the linkage 110 contacts the frame 162 to ultimately move the braking pad 174 from the first braking pad position to the second braking pad position, a mechanical advantage is provided (compared to an embodiment where the fin 106 directly engages the frame 162). In some embodiments, X1 is 2.25 times the length of X2. Thus, the force required to move the braking pad 174 from the first braking pad position to the second braking pad position is approximately less than half (i.e., approximately 45%) of the force required if the fin 106 were directly engaging the frame 162. In other words, by using the linkage 110, the operator is required to apply approximately 55% less force to the trigger 98 compared to an embodiment in which the linkage 110 is omitted and the trigger fin 106 was directly engaged with the frame 162.

Various features of the invention are set forth in the following claims.

What is claimed is:

1. An angle grinder comprising:
a motor;
an output member to which a grinding disc is attachable, the output member defining an output axis;
a drive shaft configured to transfer torque from the motor to the output member, the drive shaft defining a drive axis that is transverse to the output axis;
a braking disc coupled to the drive shaft for rotation therewith;
a braking pad linearly moveable relative to the braking disc in a direction transverse to the drive axis between a first braking pad position, in which the braking pad is in contact with the braking disc, and a second braking pad position, in which the braking pad is spaced from and not in contact with the braking disc;
a biasing member biasing the braking pad toward the first braking pad position; and
a trigger pivotable about a trigger axis between a first trigger position, in which the motor is deactivated, and a second trigger position, in which the motor is activated;
wherein in response to the trigger being pivoted from the first trigger position to the second trigger position, the braking pad is moved from the first braking pad position to the second braking pad position.

2. The angle grinder of claim 1, wherein the biasing member is wrapped around the braking pad.

3. The angle grinder of claim 1, further comprising a linkage pivotable about a linkage axis that is parallel to the trigger axis, the linkage pivotable between a first linkage position, in which the braking pad is in the first braking pad position, and a second linkage position, in which the linkage moves the braking pad to the second braking pad position, wherein the linkage is in the first linkage position when the trigger is in the first trigger position, and wherein the linkage is pivotable to the second linkage position in response to the trigger being pivoted from the first trigger position to the second trigger position.

4. The angle grinder of claim 3, further comprising a frame to which the braking pad is coupled, wherein in response to the linkage pivoting from the first linkage position to the second linkage position, the frame is moved by the linkage in a direction transverse to the drive axis to move the braking pad from the first braking pad position to the second braking pad position.

5. The angle grinder of claim 4, further comprising a first rail and a second rail that is parallel to the first rail, and wherein the frame is moveable in a direction transverse to the first and second rails.

6. The angle grinder of claim 5, wherein the biasing member is a spring having a first spring end secured to the first rail and a second spring end secured to the second rail, and wherein the biasing member is wrapped around the braking pad.

7. The angle grinder of claim 6, wherein the braking pad includes a groove in which the spring is arranged.

8. The angle grinder of claim 1, wherein the braking pad is moveable in a direction perpendicular to the drive axis between the first braking pad position and the second braking pad position.

9. An angle grinder comprising:
a motor;
an output member to which a grinding disc is attachable, the output member defining an output axis;
a drive shaft configured to transfer torque from the motor to the output member, the drive shaft defining a drive axis that is transverse to the output axis;
a braking disc coupled to the drive shaft for rotation therewith;
a braking pad moveable between a first braking pad position, in which the braking pad is in contact with the braking disc, and a second braking pad position, in which the braking pad is spaced from and not in contact with the braking disc;
a biasing member including a first end, an opposite second end, and a coil portion between the first and second ends, the coil portion wrapped around the braking pad and biasing the braking pad toward the first braking pad position; and
a trigger moveable between a first trigger position, in which the motor is deactivated, and a second trigger position, in which the motor is activated;
wherein in response to the trigger being moved from the first trigger position to the second trigger position, the braking pad is moved from the first braking pad position to the second braking pad position.

10. The angle grinder of claim 9, wherein the braking pad includes a groove in which the biasing member is arranged.

11. The angle grinder of claim 9, further comprising a frame to which the braking pad is coupled, wherein in response to the trigger moving from the first trigger position to the second trigger position, the frame is moved by the trigger to move the braking pad from the first braking pad position to the second braking pad position.

12. The angle grinder of claim 11, further comprising a first rail and a second rail that is parallel to the first rail, and wherein the frame is moveable in a direction transverse to the first and second rails.

13. The angle grinder of claim 12, wherein the biasing member is a spring having a first spring end secured to the first rail and a second spring end.

14. The angle grinder of claim 13, wherein the second spring end is secured to the second rail.

15. The angle grinder of claim 11, further comprising a linkage in contact with the trigger and the frame, the linkage moveable between a first linkage position, in which the braking pad is in the first braking pad position, and a second linkage position, in which the linkage moves the frame to move the braking pad to the second braking pad position, wherein the linkage is in the first linkage position when the trigger is in the first trigger position, and wherein the linkage is moveable to the second linkage position in response to the trigger being moved from the first trigger position to the second trigger position.

16. The angle grinder of claim 9, wherein the braking pad is moveable between the first and second braking pad positions in a direction transverse to the drive axis.

17. An angle grinder comprising:
a housing;
a motor supported within the housing;
an output member to which a grinding disc is attachable, the output member defining an output axis;
a drive shaft configured to transfer torque from the motor to the output member, the drive shaft defining a drive axis that is transverse to the output axis;
a braking disc coupled to the drive shaft for rotation therewith;
a braking pad moveable between a first braking pad position, in which the braking pad is in contact with the braking disc, and a second braking pad position, in which the braking pad is spaced from and not in contact with the braking disc;
a frame to which the braking pad is coupled;
a first rail and a second rail that is parallel to the first rail, the first and second rails being immovable relative to the housing, wherein the frame is linearly movable in a direction transverse to the first and second rails;
a biasing member biasing the braking pad toward the first braking pad position, wherein the biasing member is a spring having a first spring end secured to the first rail and a second spring end secured to the second rail;
a trigger pivotable about a trigger axis between a first trigger position, in which the motor is deactivated, and a second trigger position, in which the motor is activated; and
a linkage pivotable about a linkage axis that is parallel to the trigger axis from a first linkage position, in which the braking pad is in the first braking pad position, to a second linkage position, during which the linkage moves the braking pad from the first braking pad position to the second braking pad position;
wherein the linkage is moved from the first linkage position to the second linkage position in response to the trigger being pivoted from the first trigger position to the second trigger position, and
wherein in response to the linkage pivoting from the first linkage position to the second linkage position, the frame is moved by the linkage to move the braking pad from the first braking pad position to the second braking pad position.

18. The angle grinder of claim 17, wherein the biasing member is wrapped around the braking pad.

19. The angle grinder of claim 18, wherein the braking pad includes a groove in which the biasing member is arranged.

20. The angle grinder of claim 17, wherein the linkage includes a first arcuate portion that is engageable by the trigger and a second arcuate portion configured to engage the frame, and wherein the first arcuate portion is partially defined by a first circle having a first origin, and wherein the second arcuate portion is partially defined by a second circle having a second origin.

21. The angle grinder of claim 20, wherein the linkage axis, the first origin, and the second origin are intersected by a reference axis, and wherein a first distance is defined between the first origin and the linkage axis along the reference axis and a second distance is defined between the second origin and the linkage axis along the reference axis, and wherein the first distance is greater than the second distance.

22. The angle grinder of claim 21, wherein the first distance is at least 2.25 times greater than the second distance.

23. The angle grinder of claim 1, wherein
the biasing member includes a first end, an opposite second end, and a coil portion between the first and second ends, and
wherein the braking pad includes a groove in which the coil portion is arranged.

24. The angle grinder of claim 20, wherein
the first arcuate portion is integrally formed with the second arcuate portion.

* * * * *